(12) United States Patent
Honji et al.

(10) Patent No.: US 11,538,226 B2
(45) Date of Patent: Dec. 27, 2022

(54) INFORMATION PROCESSING DEVICE, INFORMATION PROVIDING SYSTEM, AND INFORMATION PROCESSING METHOD

(71) Applicant: HONDA MOTOR CO., LTD., Tokyo (JP)

(72) Inventors: Masaya Honji, Wako (JP); Makoto Yamamura, Wako (JP); Tsukasa Sugino, Wako (JP); Takayuki Kawai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/189,294

(22) Filed: Mar. 2, 2021

(65) Prior Publication Data
US 2021/0287444 A1 Sep. 16, 2021

(30) Foreign Application Priority Data
Mar. 12, 2020 (JP) .............................. JP2020-043283

(51) Int. Cl.
*G06T 19/00* (2011.01)
*G06T 7/00* (2017.01)
(Continued)

(52) U.S. Cl.
CPC .......... *G06T 19/006* (2013.01); *G01C 21/005* (2013.01); *G06T 7/0012* (2013.01);
(Continued)

(58) Field of Classification Search
CPC ....... G06T 19/006; G06T 7/90; G06T 7/0012; G01C 21/005; B64C 39/024;
(Continued)

(56) References Cited

U.S. PATENT DOCUMENTS

2011/0153172 A1 6/2011 Anderson
2019/0385114 A1* 12/2019 Willey ............... G06Q 10/0635
(Continued)

FOREIGN PATENT DOCUMENTS

| CA | 2495646 | 8/2005 |
|---|---|---|
| EP | 3707990 | 9/2020 |

(Continued)

OTHER PUBLICATIONS

Corrigan; Fintan; Feb. 10, 2020; Multispectral Imaging Camera Drones in Farming Yield Big Benefits; https://www.dronezon.com/learn-about-drones-quadcopters/multispectral-sensor-drones-in-farming-yield-big-benefits/; (Year: 2020).*

(Continued)

*Primary Examiner* — Todd Buttram
(74) *Attorney, Agent, or Firm* — Amin, Turocy & Watson, LLP (57) ABSTRACT

An information processing device includes a vegetation analysis section configured to analyze a vegetation state of a monitoring area on the basis of detection information acquired from a detection unit and indicating a status of the monitoring area, a restricted area determination section configured to define a restricted area, where entry is restricted, in the monitoring area on the basis of the vegetation state, and a guidance information providing section configured to provide a terminal device with guidance information indicating restrictions on entry into the restricted area.

15 Claims, 7 Drawing Sheets

(51) Int. Cl.
  *G06T 7/90* (2017.01)
  *G01C 21/00* (2006.01)
  *A01G 20/47* (2018.01)
  *A01D 34/00* (2006.01)

(52) U.S. Cl.
  CPC .............. *G06T 7/90* (2017.01); *A01D 34/008* (2013.01); *A01G 20/47* (2018.02); *G06T 2207/10024* (2013.01); *G06T 2207/30188* (2013.01); *G06T 2207/30232* (2013.01)

(58) Field of Classification Search
  CPC .......... B64C 2201/127; B64C 2201/00; B64C 2201/14; G05D 1/0094
  See application file for complete search history.

(56) References Cited

U.S. PATENT DOCUMENTS

2020/0119459 A1* 4/2020 Fried .................... H01Q 21/065
  2020/0233413 A1   7/2020 Einecke et al.
  2021/0232818 A1*  7/2021 Saxena ................ G06V 20/188

FOREIGN PATENT DOCUMENTS

| | | | |
  |---|---|---|---|
  | EP | 3932166 A1 * | 1/2022 | ........... A01B 79/005 |
  | JP | 2012-236244 | 12/2012 | |
  | JP | 2019-071046 | 5/2019 | |
  | WO | WO-9958690 A2 * | 11/1999 | ............. A21D 2/186 |
  | WO | 2019/107179 | 6/2019 | |
  | WO | 2019/225115 | 11/2019 | |
  | WO | WO-2020085101 A1 * | 4/2020 | |

OTHER PUBLICATIONS

DJI, Dec. 19, 2017; https://www.youtube.com/watch?v=UhjmCen46i0 (Year: 2017).*
  German Office Action for German Patent Application No. 102021105535.0 dated Jan. 31, 2022.

* cited by examiner

INFORMATION PROCESSING DEVICE, INFORMATION PROVIDING SYSTEM, AND INFORMATION PROCESSING METHOD

CROSS-REFERENCE TO RELATED APPLICATION

Priority is claimed on Japanese Patent Application No. 2020-043283, filed Mar. 12, 2020, the content of which is incorporated herein by reference.

BACKGROUND

Field of the Invention

The present invention relates to an information processing device, an information providing system, and an information processing method.

Description of Related Art

Natural lawn (hereinafter, referred to as "lawn") is cultivated in many facilities such as parks, sports fields, gardens, and exteriors. Lawn has the advantages in terms of safety and landscaping and is cultivated mainly for exercise, resting, appreciation, or security. In order to increase the value of a facility, it is desirable to densely cover the ground surface and maintain the growth of the lawn in a cultivation area of the lawn. On the other hand, entry excessive numbers of people into a cultivation area may be a major cause of deterioration of the growth state. Therefore, an administrator of a facility may set an area, where the growth period from the start of cultivation has been short, or an area, where a growth state is inferior, as a so-called off-limits area. In the off-limits area, signboards may often be installed to make a notification or fences may be installed to restrict the entry of people.

International Publication No. 2019/107179 discloses a vegetation management system that performs processes for acquiring an image of vegetation to be managed, analyzing the image as at least input information, outputting a vegetation index related to lawn as analysis results, determining details of work to be performed on the vegetation according to the analysis result, and performing work on the vegetation according to the details of work (additionally, for example, see International Publication No. 2019/225115, Japanese Unexamined Patent Application, First Publication No. 2012-236244, and Japanese Unexamined Patent Application, First Publication No. 2019-071046).

SUMMARY

However, the administrator is required to make a notification for visitors of the off-limits area and to restrict entry. For example, the administrator is required to bring members such as signboards and fences and install the members. In an installation site, the lawn or the facility may be damaged or the landscape may be spoiled due to the installation of the members.

The aspect according to the present invention is achieved in view of the problems described above, and one object of the present invention is to provide an information processing device, an information providing system, and an information processing method, by which it is possible to efficiently manage vegetation.

In order to solve the above problems and achieve the above object, the present invention employs the following aspects.

(1) An information processing device according to an aspect of the present invention includes: a vegetation analysis section configured to analyze a vegetation state of a monitoring area on the basis of detection information acquired from a detection unit and indicating a status of the monitoring area; a restricted area determination section configured to define a restricted area, where entry is restricted, in the monitoring area on the basis of the vegetation state; and a guidance information providing section configured to provide a terminal device with guidance information indicating restrictions on entry into the restricted area.

(2) In the aspect (1), the restricted area determination section may analyze a usage status of the monitoring area on the basis of the detection information and define the restricted area on the basis of the usage status.

(3) In the aspect (1) or (2), the restricted area determination section may define a leading area to be a leading target in the monitoring area on the basis of the vegetation state of the monitoring area, and the guidance information providing section may provide the terminal device with the guidance information indicating leading to the leading area.

(4) An information providing system according to an aspect of the present invention includes: the information processing device and any one of the aspects (1) to (3), wherein the terminal device includes a presentation unit configured to present the guidance information.

(5) In the aspect (4), the terminal device may include: a position detection unit configured to detect a position of its own device; a direction detection unit configured to detect a direction of the own device; and a presentation processing section configured to allow the presentation unit to present the guidance information when the position of the own device is within a predetermined range from the restricted area and the direction is within a range in a direction from the position of the own device to the restricted area.

(6) In the aspect (5), the position detection unit may include a height detection section configured to detect a height of the own device, the presentation unit may include a display configured to allow an outside view to pass therethrough, and the presentation processing section may generate a figure obtained by projecting an outer edge of the restricted area onto the display facing the direction of the own device from the position of the own device, and allow the display to display the figure.

(7) In the aspect (4), the terminal device may be a work machine that travels in the monitoring area and performs predetermined work, and the work machine may include: the detection unit; and a position information acquisition unit configured to acquire a position of its own machine.

(8) An information processing method according to an aspect of the present invention is an information processing method in the above information processing device and includes: a vegetation analysis step of analyzing a vegetation state of a monitoring area on the basis of detection information acquired from a detection unit and indicating a status of the monitoring area; and a restricted area determination step of defining a restricted area, where entry is restricted, in the monitoring area on the basis of the vegetation state.

According to the aspects (1), (4), and (8), the guidance information for guiding restrictions on entry into the restricted area defined from the vegetation state analyzed on the basis of the status of the monitoring area is presented to a user of the terminal device. Since work for notifying a user of the monitoring area of the restricted area or the restrictions on entry into the restricted area is reduced, it is possible to efficiently manage vegetation in the monitoring area.

According to the aspect (2), the restricted area is defined by further considering the usage status of the monitoring area, which is analyzed from the detection information, as a factor that affects the vegetation state. Therefore, it is possible to accurately define an area, where vegetation needs to be protected, as the restricted area.

According to the aspect (3), the guidance information for guiding leading to the leading area defined from the vegetation state analyzed on the basis of the status of the monitoring area is presented to a user of the terminal device. Since the user of the terminal device is encouraged to proceed toward the leading area, it is possible to more reliably avoid entry into the restricted area and to protect vegetation in the restricted area.

According to the aspect (5), when the own device is close to the restricted area and the direction of the own device is directed to the restricted area, the guidance information can be presented to the presentation unit. When the own device is separated from the restricted area or the direction of the own device is different from the direction of the restricted area, the guidance information is not presented. Therefore, when a user is less likely to enter the restricted area, since the presentation of the guidance information is restricted, the possibility of being presented is low, so that it is possible to improve the satisfaction of the user for the terminal device.

According to the aspect (6), a user who wears the presentation unit can visually recognize the figure superimposed on the outside view through the display, which includes the restricted area in the three-dimensional space, and indicating the outer edge of the restricted area displayed on the display. Therefore, the user can intuitively grasp the restricted area on the basis of the figure visually recognized in the actual three-dimensional space.

According to the aspect (7), the terminal device can guide the restricted area to a user in the monitoring area as a work machine that performs work while traveling in the monitoring area, and acquire detection information in correlation with position information indicating the traveled position. Therefore, the user in the monitoring area can be guided to the restricted area even though the user does not carry the terminal device individually, and can acquire the detection information even though any special equipment is not provided. By traveling a work machine as the terminal device to any place of an administrator, it is possible to perform predetermined work, guide the restricted area, and acquire the detection information, thereby improving the efficiency of vegetation management.

DESCRIPTION OF EMBODIMENTS

Hereinafter, an embodiment of the present invention will be described with reference to the drawings.

Figure 1:
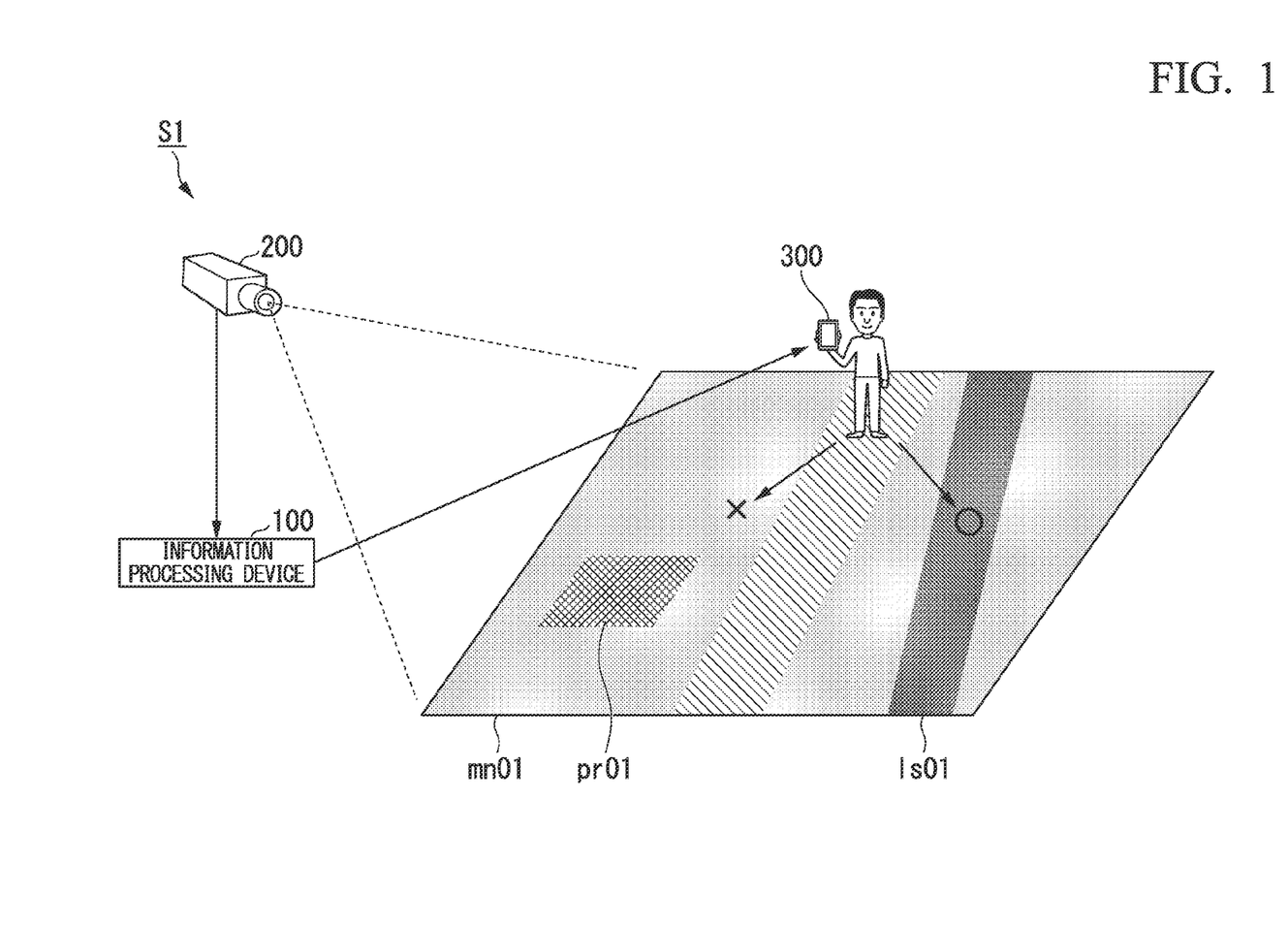
FIG. 1 is an explanation diagram for explaining the outline of an information providing system according to the present embodiment.

FIG. 1 is an explanation diagram for explaining the outline of an information providing system 51 according to the present embodiment.

The main purpose of the information providing system 51 is to manage a vegetation state of a predetermined monitoring area mn01. The vegetation state is, for example, a vegetation state of lawn cultivated on the ground surface of the monitoring area mn01. The information providing system 51 includes an information processing device 100 and a detection unit. The information processing device 100 analyzes the vegetation state of the monitoring area on the basis of detection information acquired from the detection unit and indicating the status of the monitoring area mn01. A camera 200 shown in FIG. 1 is an example of the detection unit. The camera 200 acquires, as the detection information, an image indicating the status in the monitoring area mn01. The information processing device 100 determines the vegetation state on the ground surface from a color distribution indicated by the captured image by using a known image recognition technology, for example.

FIG. 1 shows an example of the intensity of the analyzed vegetation state using shades. The intensity of a darker part is high, and the intensity of a lighter part is low. The information processing device 100 defines a restricted area, where entry is restricted, in the monitoring area on the basis of the determined vegetation state. The information processing device 100 determines, for example, an area, where the vegetation state is lower than a predetermined intensity in the monitoring area mn01, as a restricted area pr01. The information processing device 100 provides, for example, guidance information indicating restrictions on entry into the restricted area pr01 to a terminal device 300 of a person located in the monitoring area mn01. With this, even though an administrator visits the restricted area pr01 and does not install a member for indicating or protecting the restricted area pr01, it is possible to promote restrictions on entry into the restricted area pr01.

(Information Processing Device)

Figure 2:
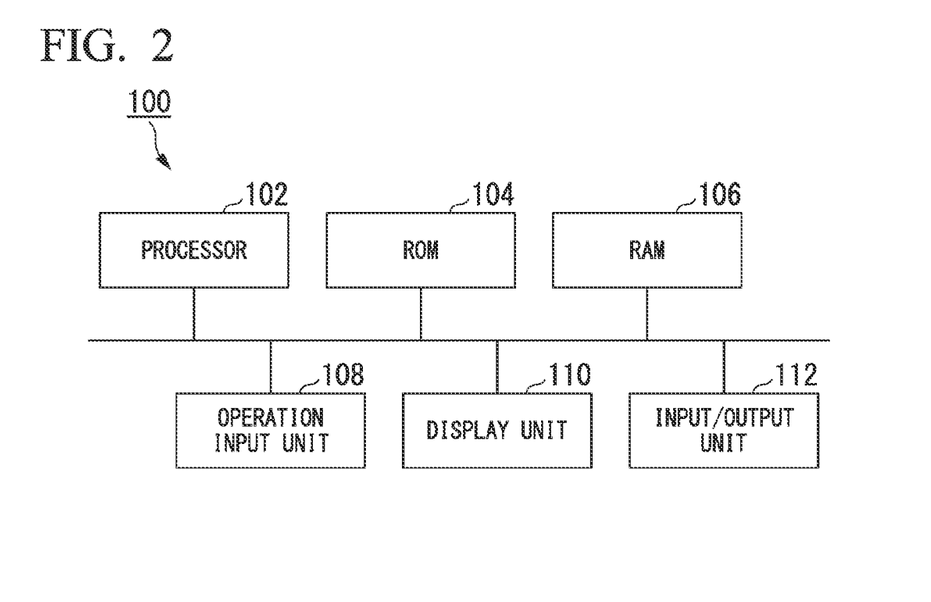
FIG. 2 is a schematic block diagram showing a hardware configuration example of an information processing device according to the present embodiment.

Next, a hardware configuration example of the information processing device 100 according to the present embodiment will be described. FIG. 2 is a schematic block diagram showing the hardware configuration example of the information processing device 100 according to the present embodiment. The information processing device 100 is a computer including a processor 102, a ROM 104, a RAM 106, an operation input unit 108, a display unit 110, and an input/output unit 112. The processor 102, the ROM 104, the RAM 106, the operation input unit 108, the display unit 110, and the input/output unit 112 are connected so as to be able to input/output various data to/from one another.

The processor 102 reads, for example, programs and various data stored in the ROM 104, and executes the programs to control the operation of the information processing device 100. The processor 102 is, for example, a central processing unit (CPU).

In the present application, executing a process instructed by various instructions (commands) described in the program may be referred to as "execution of the program", "executing the program", and the like.

The ROM (Read Only Memory) 104 stores, for example, the programs to be executed by the processor 102.

The RAM (Random Access Memory) 106 serves as, for example, a working area for temporarily storing various data and programs to be used in the processor 102.

The operation input unit 108 is an input device that accepts a user's operation, generates an operation signal corresponding to the accepted operation, and outputs the generated operation signal to the processor 102. The operation input unit 108 corresponds to, for example, a pointing device such as a mouse and a keyboard. In the present application, operating according to information indicated by an input operation signal may be simply referred to as "operating according to an operation".

The display unit 110 includes, for example, a display for displaying various display information on the basis of image data and the like inputted from the processor 102.

The input/output unit 112 is connected to other devices in a wired or wireless manner and can input and output various data. The input/output unit 112 includes a communication module that connects to a network in a wired or wireless manner, and can transmit and receive various data to/from other devices connected to the network.

Figure 3:
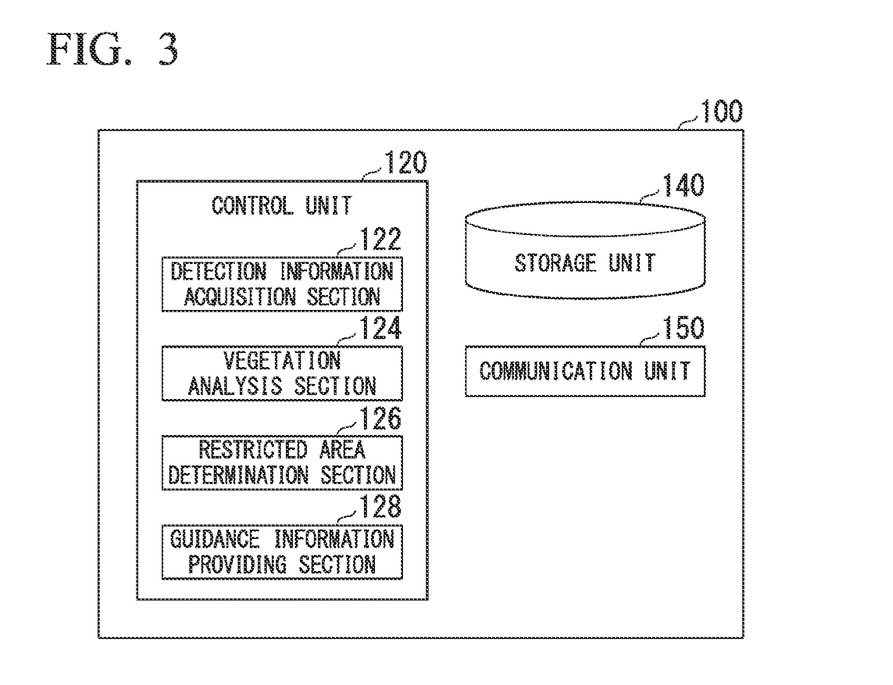
FIG. 3 is a block diagram showing a functional configuration example of the information processing device according to the present embodiment.

Next, a functional configuration example of the information processing device 100 according to the present embodiment will be described. FIG. 3 is a block diagram showing the functional configuration example of the information processing device 100 according to the present embodiment. The information processing device 100 includes a control unit 120, a storage unit 140, and a communication unit 150.

The control unit 120 implements the functions of the information processing device 100 and performs various processes for controlling the functions. The control unit 120 is implemented by the processor 102 that executes a predetermined control program. The control unit 120 includes a detection information acquisition section 122, a vegetation analysis section 124, a restricted area determination section 126, and a guidance information providing section 128.

The detection information acquisition section 122 acquires detection information from the detection unit. The detection information acquisition section 122 receives, for example, image data, which indicates a captured image, from the camera 200 as an example of detection information by using the communication unit 150. The detection information acquisition section 122 receives image data at predetermined time intervals (for example, 1 second to 30 seconds). The detection information acquisition section 122 outputs the acquired detection information to the vegetation analysis section 124. The image indicated by the received image data indicates an image of an object or the ground surface in a predetermined monitoring area. The image may be a still image or a moving image.

Figure 4:
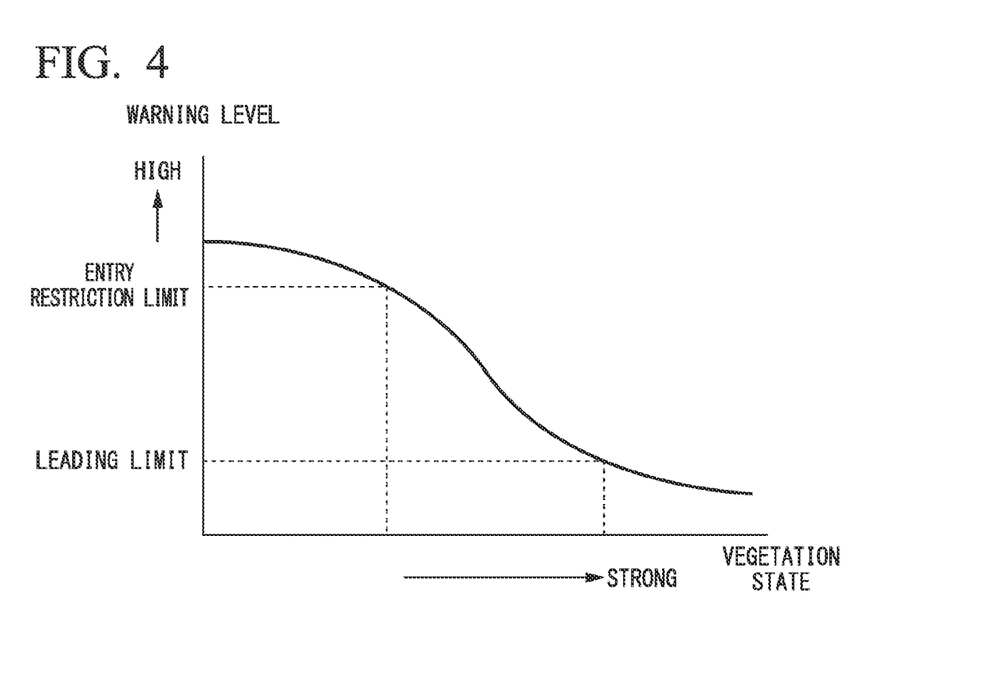
FIG. 4 is a diagram showing an example of the relationship between a warning level and a vegetation state.

The vegetation analysis section 124 analyzes a vegetation state of the monitoring area by using the detection information input from the detection information acquisition section 122. The vegetation analysis section 124 can use a preset analysis model and define, with respect to a signal value indicating the color of an image represented by the detection information for each element area (hereinafter, referred to as a "grid") as a partial area of the monitoring area, an output value indicating the vegetation state of the grid by using a predetermined calculation method. The analysis model is, for example, data including a parameter set for defining the output value by performing a calculation based on the predetermined calculation method on an input value. The predetermined calculation method can use, for example, a neural network, multiple regression analysis, and the like. The vegetation analysis section 124 calculates, for example, a known feature amount as the input value from a signal value for each of a plurality of pixels in the grid. It is sufficient if a feature amount, such as the color of lawn, a length from the ground surface, the direction of growth, and density, which reflects the growth state, is used as the input value. As the feature amount to be calculated, for example, a local feature amount and a color feature amount may be used. In general, image data of a color image indicates a signal value indicating the intensity of one primary color (that is, any one of red, green, blue, and the like) corresponding to each pixel. The local feature amount indicates, for example, a spatial gradient of the signal value for each primary color. The color feature amount is, for example, a statistical representative value (for example, a mean value, a mode value, a standard deviation, and the like) between sets of color signal values, which are vectors each using a signal value of each of predetermined adjacent pixels as an element, in a set of the pixels. The vegetation analysis section 124 can calculate a warning level of the vegetation state as an example of the output value. As shown in FIG. 4, the warning level is an index value quantitatively indicating the intensity of the vegetation state. The warning level is a real number value that is smaller as the intensity is higher and is larger as the intensity is lower. The warning level may be normalized in advance so as to take a value in a predetermined range (for example, a minimum value 0 and a maximum value 100).

The vegetation analysis section 124 generates the analysis model in advance by learning by using teacher data including a plurality of data sets in which input values and known output values are associated with each other. In the learning, the vegetation analysis section 124 defines, as the analysis model, a parameter set used in a calculation such that calculation values obtained by performing the calculation based on the predetermined calculation method on the input values over all the data sets approximate to the output values of the sets. The vegetation analysis section 124 may acquire the pre-learned analysis model from another device. The vegetation analysis section 124 outputs vegetation state information, which indicates the vegetation state obtained for each grid, to the restricted area determination section 126.

Figure 5:
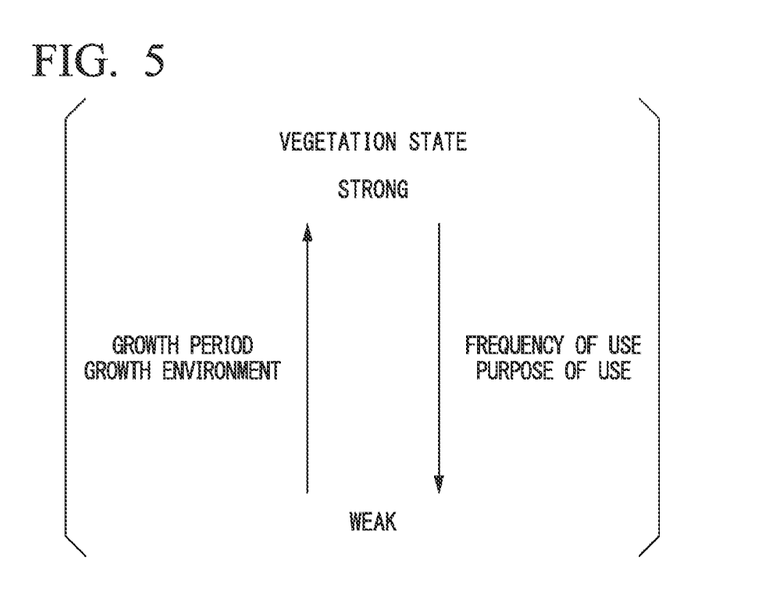
FIG. 5 is a diagram showing an example of a factor applied to the intensity of the vegetation state.

The restricted area determination section 126 defines a restricted area on the basis of the vegetation state indicated by the vegetation state information input from the vegetation analysis section 124. The restricted area determination section 126 defines, as the restricted area, a grid in which the warning level is larger than a first limit value (hereinafter, an "entry restriction limit", FIG. 4) of a predetermined warning level. The restricted area is an area where the entry of people needs to be restricted. The restricted area determination section 126 outputs restricted area information indicating the defined restricted area to the guidance information providing section 128. As the entry restriction limit, a warning level is set in advance, in which the intensity of the vegetation state is likely to be reduced if entry is allowed as is. This is because, in general, the vegetation state of lawn and the like tends to weaken as the cultivation site thereof is used more frequently and to be recovered or strengthened as the growth period for restricting passage is long (FIG. 5). The degree of weakening of the vegetation state may vary depending on the purpose of use (for example, mere passage, competition, and the like). The degree to which the vegetation state is strengthened may vary depending on the growth environment (for example, temperature, humidity, sunshine, and the like). Therefore, the vegetation state may vary for each grid.

The restricted area determination section 126 may define, as a leading area, a grid in which the warning level is smaller than a second limit value (hereinafter, a "leading limit", FIG. 4) of the predetermined warning level. The leading area is an area that is a target for leading the progress of people. The warning level used as the leading limit is a value smaller than the entry restriction limit. As the leading limit, the warning level is set in advance so that the intensity of the vegetation state may be maintained even though entry is allowed. When the leading area is defined, the restricted area determination section 126 puts the defined leading area into the restricted area information and outputs the restricted area information to the guidance information providing section 128.

The guidance information providing section 128 generates guidance information for guiding the restricted area indicated by the restricted area information input from the restricted area determination section 126. For example, the guidance information providing section 128 reads map information stored in advance in the storage unit 140, and generates guidance information including a guidance map obtained by superimposing a figure of the restricted area on a map of the monitoring area indicated by the map information. The guidance information providing section 128 may generate guidance information indicating a guidance message for guiding restrictions on entry into the restricted area, in place of or together with the guidance map. When the restricted area information includes the leading area, the guidance information providing section 128 may generate guidance information indicating the guidance map in which a map of the leading area is superimposed, in place of or together with the restricted area. The guidance information providing section 128 may generate guidance information including a guidance message for guiding leading to the leading area.

The guidance information providing section 128 transmits the generated guidance information to the terminal device 300 in the monitoring area by using the communication unit 150.

The storage unit 140 stores other data such as various data used in the process performed by the control unit 120 and data generated by the process performed by the control unit 120. The storage unit 140 is implemented using a storage medium such as the ROM 104 and the RAM 106, for example.

The communication unit 150 can be connected to other devices in a wired or wireless manner via a network such that various data can be received and transmitted. The communication unit 150 is implemented using a communication interface constituting the input/output unit 112, for example.

The camera 200 captures an image of the ground surface serving as a monitoring area as an example of detection information, and transmits image data indicating the captured image to the information processing device 100 via the network in a wired or wireless manner. The camera 200 may be a moving image capturing device capable of capturing a moving image at a predetermined frame rate, or a still age capturing device capable of capturing a still image at a predetermined timing. The camera 200 does not necessarily have a visual field in which the entire monitoring area can be captured at a time and the position thereof may be fixed, but the present invention is not limited thereto. The camera 200 may capture an image of only a part of the monitoring area at a time, may be supported by a moving body capable of moving the shooting range thereof, or may be supported by a rotating body capable of changing a shooting direction as the shooting range thereof. The detection information acquisition section 122 or the vegetation analysis section 124 of the information processing device 100 may limit the acquisition time of image data as the detection information used for analyzing the vegetation state to the time when the analysis accuracy can be sufficiently secured (for example, during the daytime when the weather is good).

(Terminal Device)

Figure 6:
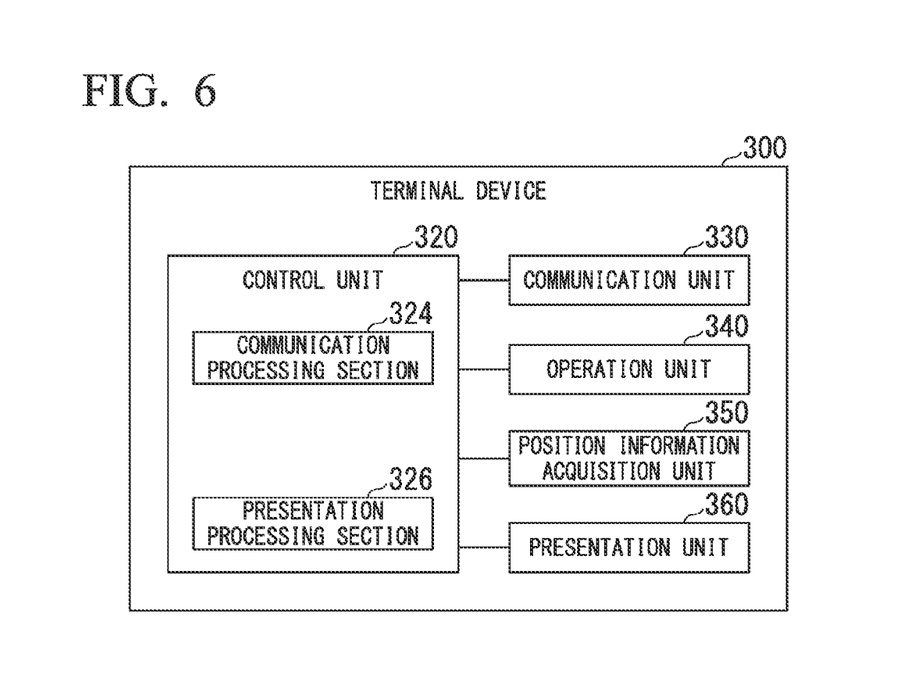
FIG. 6 is a block diagram showing a functional configuration example of a terminal device according to the present embodiment.

Next, a configuration example of the terminal device 300 according to the present embodiment will be described. FIG. 6 is a block diagram showing a functional configuration example of the terminal device 300 according to the present embodiment. The terminal device 300 includes a control unit 320, a communication unit 330, an operation unit 340, a position information acquisition unit 350, and a presentation unit 360.

The control unit 320 implements the functions of the terminal device 300 and performs various processes for controlling the functions. The control unit 320 includes a communication processing section 324 and a presentation processing section 326.

The communication processing section 324 performs a process related to communication with other devices. The communication processing section 324 acquires the guidance information from the information processing device 100 by using the communication unit 330. The communication processing section 324 outputs the acquired guidance information to the presentation processing section 326.

The presentation processing section 326 generates presentation data for presenting, to a user, the guidance information input from the communication processing section 324, and outputs the generated presentation data to the presentation unit 360. Thus, it is possible to allow the presentation unit 360 to present the guidance information.

The presentation processing section 326 may generate and output the presentation data when the position of its own device (hereinafter, own device position) indicated by position information input from the position information acquisition unit 350 is within the restricted area included in the guidance information. The presentation processing section 326 may generate and output the presentation data when the own device position is within a predetermined range (for example, a distance within 3 m to 10 m from an outer edge of the restricted area) from the restricted area included in the guidance information.

The operation unit 340 accepts a user's operation and outputs an operation signal corresponding to the accepted operation to the control unit 320. With this, the function of the terminal device 300 is controlled according to the operation.

The position information acquisition unit 350 acquires the position of the own device and outputs position information indicating the acquired position to the control unit 320. The position information acquisition unit 350 includes, for example, a global positioning system (GPS). The GPS measures latitude and longitude indicating the position of its own unit on the basis of an arrival time difference among reference signals transmitted from at least three or more GPS satellites that orbit the Earth.

The position information acquisition unit 350 may include a position estimation section that defines the position of the own unit by communication in place of or together with the GPS. The position estimation section may have base station data indicating identification information for each base station constituting the network and the position in association with each other stored therein in advance. When the identification information of a base station used by the communication unit 330 for communication is notified to the base station, the position estimation section may identify a position corresponding to the notified identification information by referring to the base station data, and define the identified position as the position of the own unit. The communication unit 330 receives reference signals each having a known signal sequence and identification information of three or more base stations from the three or more base stations. The position estimation section refers to the base station data, and specifies the position corresponding to each of the received identification information. The position estimation section can compare the signal sequence of each reference signal received by a specific time with a known signal sequence, and detect propagation time differences of the reference signals between the base stations. The position estimation section can define the position of the own unit in the two-dimensional plane on the basis of the detected propagation time differences and the position of each base station.

The presentation unit 360 presents the guidance information on the basis of the presentation data input from the control unit 320. The presentation unit 360 includes, for example, a display that displays visual information such as images, symbols, and characters. The display of the presentation unit 360 displays guidance information expressed by the visual information. The presentation unit 360 may include a speaker that reproduces speech. When the guidance information includes a message expressed by guidance speech, the speaker of the presentation unit 360 reproduces the guidance speech.

Each part of the terminal device 300 may be configured using a dedicated member, but a part of the terminal device 300 may be configured as a computer. In such a case, the terminal device 300 may include the hardware shown in FIG. 2. The control unit 320 is implemented by a processor which corresponds to the processor 102 and executes a predetermined program. The operation unit 340 has a configuration corresponding to the operation input unit 108. The communication unit 330 has a configuration corresponding to the input/output unit 112. The display of the presentation unit 360 has a configuration corresponding to the display unit 110.

Figure 7:
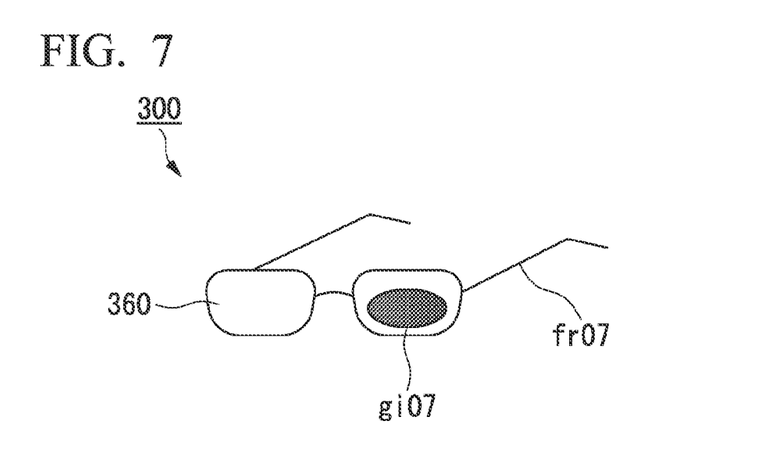
FIG. 7 is a diagram showing an example of an external appearance configuration of the terminal device according to the present embodiment.

The terminal device 300 may be any form of information communication device such as a multifunctional telephone (a so-called a smart phone) and a tablet terminal device. The terminal device 300 may be configured as what is called a spectacle-type terminal device as shown in FIG. 7. The spectacle-type terminal device includes a frame fr07 and two transmissive displays. These two transmissive displays are juxtaposed and their perimeters are supported by the frame fr07. The transmissive display allows the outside view to pass therethrough and can visually display guidance information based on the presentation data input from the control unit 320. Both ends of the frame fr07 have a shape that can be attached to and detached from the left and right ears of a user. Therefore, the user can visually recognize visual information, in which guidance information gi07 is superimposed on the outside view, in a state in which the user is wearing the terminal device 300. Members other than the display may be installed at a position that does not cover the display of the frame fr07, or may be stored in a separate housing without being fixed to the frame fr07. However, these members can be connected to the display so that the presentation data can be transmitted in a wired or wireless manner.

Figure 8:
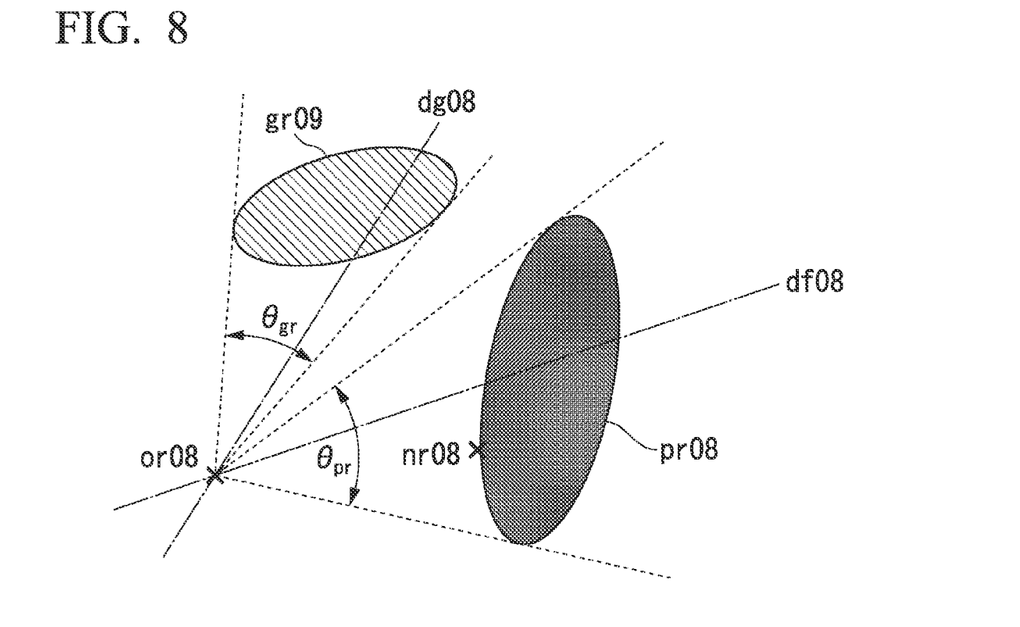
FIG. 8 is an explanation diagram for explaining the positional relationship between the terminal device in a two-dimensional area and a restricted area/a leading area.

The terminal device 300 configured as the spectacle-type terminal device may include a direction sensor on the frame. As shown in FIG. 8, the direction sensor detects the forward direction from the frame as a display direction df08 and outputs a direction signal indicating the detected direction to the control unit 320. The direction detected by the direction sensor is regarded as a line-of-sight direction of the user who is wearing the terminal device 300. When the guidance information includes information of a restricted area pr08, the presentation processing section 326 specifies, as the position or08 of the own device, the position of the own unit indicated by the position information input from the position information acquisition unit 350. When the position or08 of its own unit is within a predetermined distance range from the latest contact point nr08 of the outer edge of the restricted area, the presentation processing section 326 may specify a range $\theta_{pr}$ (hereinafter, restricted range $\theta_{pr}$) in the direction of the restricted area pr08 based on the position of the own unit. When the detected display direction df08 is within the restricted range $\theta_{pr}$, the presentation processing section 326 may output the presentation data including the guidance information to the presentation unit 360. With this, when the user approaches the restricted area pr08 and faces the restricted area pr08, the guidance information is presented on the display.

Figure 9:
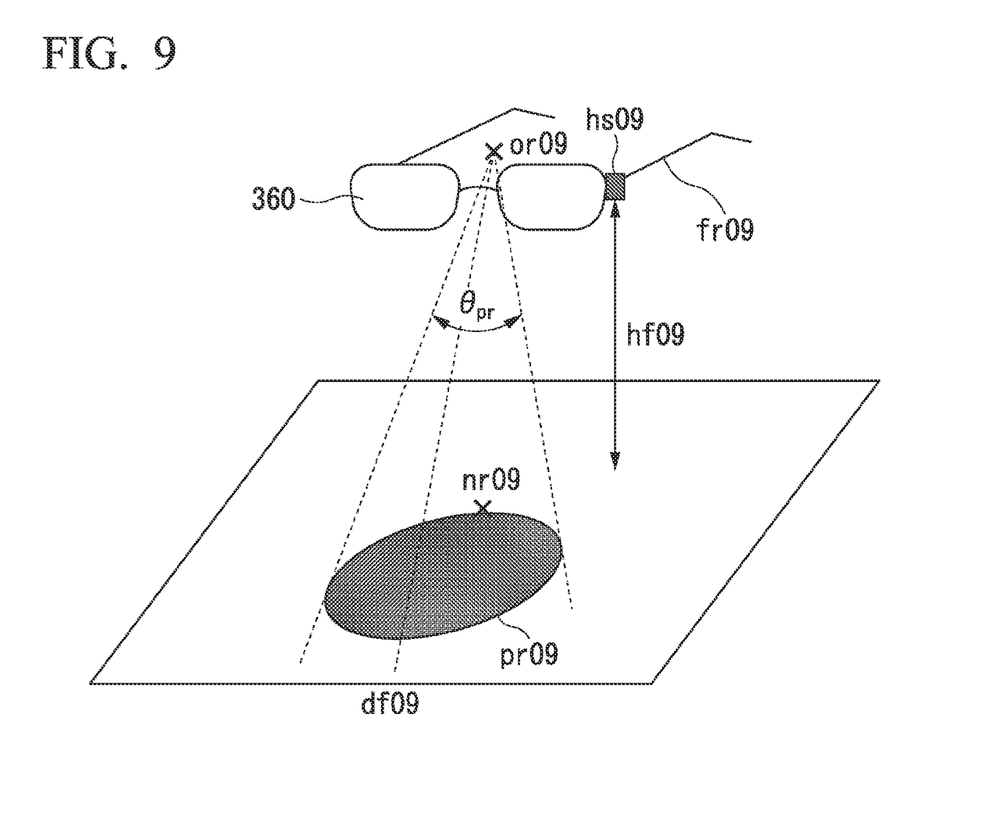
FIG. 9 is an explanation diagram for explaining the positional relationship between the terminal device in a three-dimensional area and a restricted area.

When the guidance information includes information of a leading area gr09, the presentation processing section 326 may put, into the guidance information, leading direction information for guiding the direction from the position or08 of the own device to any position (for example, the latest contact point or the center of gravity) in the leading area gr09 as a leading direction dg08. For example, the presentation processing section 326 determines whether a part or all of a range $\theta_{gr}$ (hereinafter, restricted range $\theta_g r$) in the direction of the restricted area pr08 based on the position or08 of the own unit is included in the visual field range of the display. When it is determined that it is included, the presentation processing section 326 may put, into the guidance information, a symbol (mark) indicating the leading direction in coordinates of a display area (hereinafter, simply display area) of the display corresponding to the leading direction dg08. When it is determined that a part or all of the restricted range $\theta_g r$ is not included in the visual field range of the display, the presentation processing section 326 may not put the symbol indicating the leading direction into the guidance information. In such a case, the presentation processing section 326 may generate a message for guiding the leading direction (for example, please proceed in the direction of . . . ), and convert the generated message into speech data by using a known text speech synthesis technology. The presentation processing section 326 outputs the converted speech data to the speaker constituting the presentation unit 360. In such a case, the leading direction is guided to the user with speech.

The terminal device 300 configured as the spectacle-type terminal device may further include a height sensor hs09 on a frame fr09. As shown in FIG. 9, the height sensor hs09 detects a height hf09 from the ground surface to the frame fr09 as the height of the own device, and outputs a height signal indicating the detected height to the control unit 320. The presentation processing section 326 may generate a figure shown at a position at which the outer edge of a restricted area pr09 is projected onto the display facing a display direction df09 with the position or09 of the own device as a point being viewed. More specifically, the presentation processing section 326 specifies the position or09 of the own device in a three-dimensional space by the height hf09 indicated by the height signals input from the height sensor hs09 and the position of the own unit in the two-dimensional plane indicated by the position information input from the position information acquisition unit 350. When the position or09 of the own device is within a predetermined distance range from the latest contact point nr09 of the outer edge of the restricted area pr09, the presentation processing section 326 specifies the restricted range $\theta_{pr}$ in the three-dimensional space in which the direction of the outer edge of the restricted area pr09 is distributed based on the position of the own unit. The position of each point of a grid forming the restricted area pr09 is represented by the coordinate values of the three-dimensional space including the height. However, when the position of each point of the grid does not include the height and is represented by the coordinate value of the two-dimensional space, it may be assumed that the restricted area pr09 is distributed on a plane passing through the origin (for example, height 0) of the height hf09 detected by the height sensor hs09.

Figure 10:
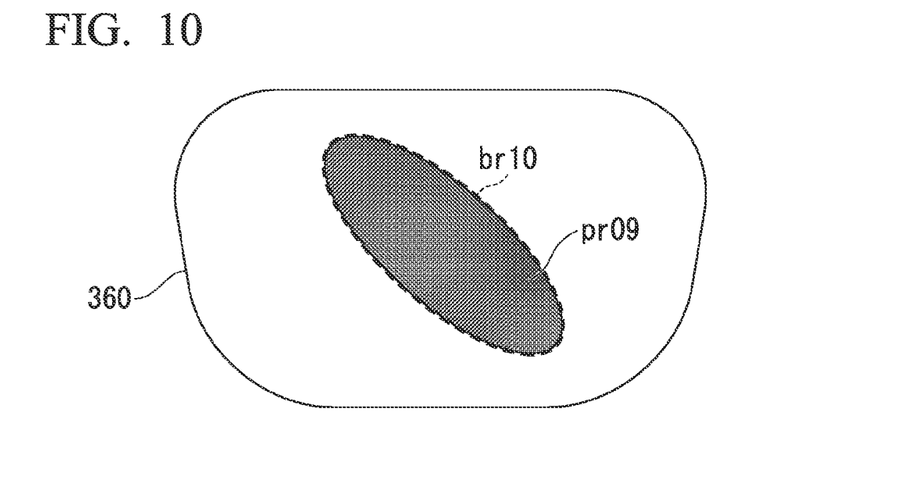
FIG. 10 is a diagram showing a display example of a figure of the restricted area presented to a presentation unit according to the present embodiment.

When the detected display direction df09 in the three-dimensional space is within the restricted range $\theta_{pr}$, the presentation processing section 326 may output the presentation data including the guidance information to the presentation unit 360. The presentation processing section 326 may put, into the guidance information, a figure obtained by projecting the outer edge of the restricted area pr09 onto the display facing the display direction df09 with the position or09 of the own device as the visual point. More specifically, the presentation processing section 326 converts the coordinates of each point constituting the outer edge of the restricted area pr09 in the three-dimensional space into the coordinates of the display in the display area, and puts, into the guidance information, information indicating a line br10 (may be either a polygon or a curve) connecting the points of the converted coordinates. Thus, as shown in FIG. 10, when the user approaches the restricted area pr09 and faces the direction df09 in the restricted area pr09, the presentation processing section 326 can allow the display constituting the presentation unit 360 to display the outside view on which the line br10 indicating the outer edge of the restricted area pr09 is superimposed.

(Information Providing Process)

Figure 11:
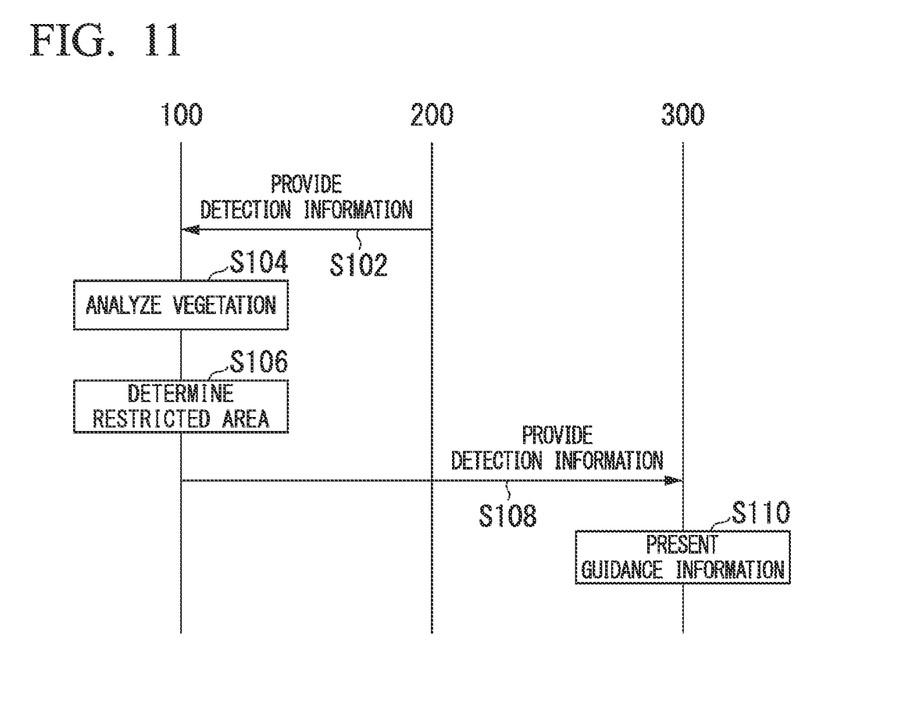
FIG. 11 is a sequence diagram showing an example of an information providing process according to the present embodiment.

Next, an example of an information providing process according to the present embodiment will be described. FIG. 11 is a sequence diagram showing an example of the information providing process according to the present embodiment.

(Step S102) The camera 200 captures an image including a predetermined monitoring area in a visual field, and transmits image data indicating the captured image to the information processing device 100 as the detection information. The detection information acquisition section 122 of the information processing device 100 receives the detection information from the camera 200, and outputs the received detection information to the vegetation analysis section 124.

(Step S104) The vegetation analysis section 124 analyzes the vegetation state of the monitoring area for each grid by using the detection information input from the detection information acquisition section 122. The vegetation analysis section 124 outputs the vegetation state information indicating the vegetation state for each grid to the restricted area determination section 126.

(Step S106) The restricted area determination section 126 defines the restricted area for each grid on the basis of the vegetation state indicated by the vegetation state information input from the vegetation analysis section 124. The restricted area determination section 126 outputs the restricted area information indicating the defined restricted area to the guidance information providing section 128.

(Step S108) The guidance information providing section 128 generates the guidance information for guiding the restricted area indicated by the restricted area information input from the restricted area determination section 126. The guidance information providing section 128 transmits the generated guidance information to the terminal device 300. The communication processing section 324 of the terminal device 300 receives the guidance information from the information processing device 100, and outputs the received guidance information to the presentation processing section 326.

(Step S110) The presentation processing section 326 outputs, to the presentation unit 360, the presentation data for presenting the guidance information input from the communication processing section 324, and allows the presentation unit 360 to present the guidance information. Thereafter, the process shown in FIG. 11 is terminated.

In the above description, the terminal device 300 to which the guidance information is provided from the information processing device 100 is mainly an information communication device; however, the present invention is not limited thereto. It is sufficient if the terminal device 300 has a function of receiving the guidance information from the information processing device 100 and being able to present the received guidance information to be recognizable by a user. A work machine may be a lawn mower for mowing lawn, weeds, and the like cultivated on the ground surface as predetermined work, or a cleaner (sweeper) for removing or sucking the mowed lawn clippings or other unnecessary objects. The work machine may have power for autonomously traveling on the ground surface, or may be a machine that does not have power and is moved by a person.

Figure 12:
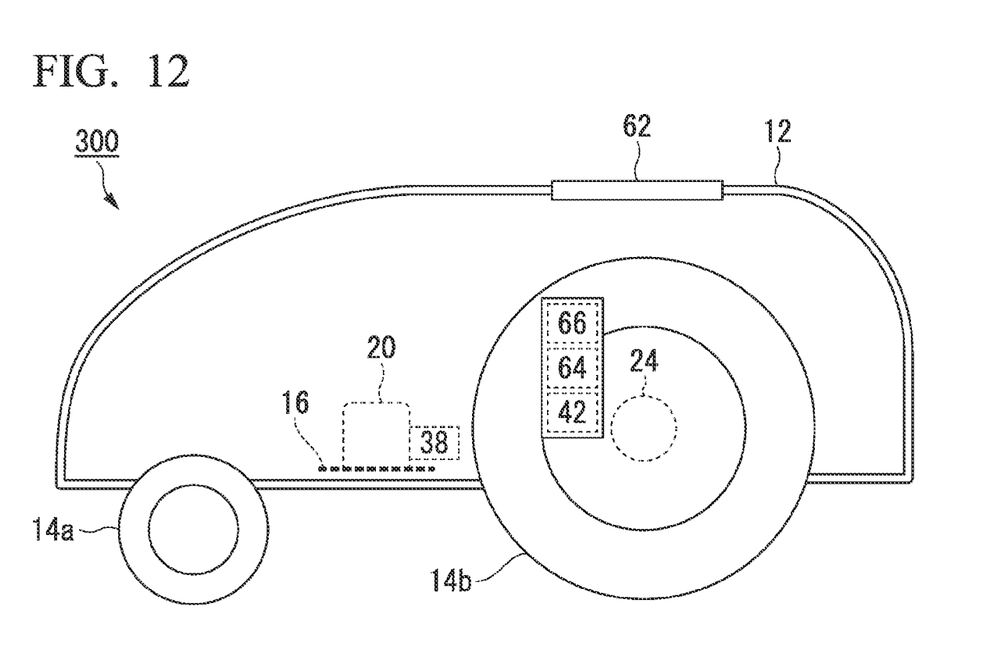
FIG. 12 is a side view showing an example of the terminal device according to the present embodiment.

FIG. 12 is a side view showing an example of the terminal device 300 according to the present embodiment. The terminal device 300 shown in FIG. 12 is a self-propelled electric lawn mower. The terminal device 300 includes front wheels 14a, rear wheels 14b, a travelling motor 24, and an electric control unit (ECU) 42. The ECU 42 is a microcomputer including a processor and a storage medium, and performs processing for implementing the function of the terminal device 300 and control for the processing. The travelling motor 24 can move the entire terminal device 300 by rotating the rear wheels 14b under the control of the ECU 42. The terminal device 300 includes a cutter blade 16 and a work motor 20. The work motor 20 rotates the cutter blade 16 attached to the bottom surface of a vehicle body 12 under the control of the ECU 42, thereby mowing grass such as lawn extending from the ground surface across the cutter blade 16. The terminal device 300 includes a communication unit 64 and a display 62. The ECU 42 has a configuration as the aforementioned control unit 320, receives the guidance information from the information processing device 100 by using the communication unit 64, and allows the display 62 serving as the presentation unit 360 and installed on the surface of the vehicle body 12 to present the guidance information. Accordingly, the information processing device 100 can transmit the guidance information to the work machine that is performing work in the monitoring area as the terminal device 300, and allow the ECU 42 of the terminal device 300 to present the guidance information on the display 62. Therefore, it is possible to transfer the guidance information to a visitor toward the monitoring area, who does not carry the terminal device 300.

The terminal device 300 configured as the work machine may also include a detection unit for acquiring detection information and a position information acquisition unit for acquiring position information indicating the position of its own machine. The terminal device 300 shown in FIG. 12 may also include the communication unit 64, a position information acquisition unit 66, and a camera 38 as an example of the detection unit on the bottom surface of the vehicle body 12. The camera 38 is installed with the visual field facing the ground surface. Therefore, the camera 38 captures an image of the ground surface, and outputs image data indicating the captured image to the ECU 42 as detection information. The position information acquisition unit 66 outputs the acquired position information to the ECU 42. The position information acquisition unit 66 may have the same configuration as the aforementioned position information acquisition unit 350. The ECU 42 correlates the position information acquired at that time with the acquired detection information, and transmits the correlated information to the information processing device 100 by using the communication unit 64. The detection information acquisition section 122 of the information processing device 100 can acquire the detection information from the terminal device 300 in correlation with position information indicating the position at that time. Therefore, the vegetation analysis section 124 can analyze and update the vegetation state for each position on the basis of the acquired detection information.

As described above, the vegetation state of the monitoring area depends on the usage status for each grid, and when the usage status up to the present time is continuous, an area where the vegetation state is weakened is likely to occur. Therefore, the restricted area determination section 126 may sequentially acquire the detection information from the detection information acquisition section 122 and analyze a usage status on the basis of the acquired detection information. For example, the restricted area determination section 126 performs a known image recognition process on image data as the detection information, and determines an image of a person and the position thereof in the captured image. The restricted area determination section 126 determines the time when a person is detected for each grid as the frequency of use within a predetermined determination period on the basis of the determined position for each time. The determination period is, for example, the latest 1 month to 12 months up to the present time. The restricted area determination section 126 may determine, as the restricted area, a grid in which the determined frequency of use is higher than a limit value of the preset frequency of use.

Even though a frequency of use is uniform, the degree of influence on the vegetation state may differ depending on the purpose of use. For example, in ball games such as running and baseball, since high pressure is applied to the ground surface by use, the vegetation state may be significantly impaired as compared with a case where the purpose of use is walking, resting, and the like. Therefore, in the image recognition process for each time, the restricted area determination section 126 analyzes the behavior of a detected person and determines the purpose of use for each grid on the basis of the analyzed behavior of the person. The restricted area determination section 126 may aggregate the purpose of use for each time and calculate the frequency of use for each purpose of use. Then, the restricted area determination section 126 calculates the total frequency of use by weighting and adding the frequency of use for each purpose of use determined within the determination period. As a weighted coefficient in the weighted addition, a larger value is set in advance for the purpose of use in which a degree of impairing the vegetation state is higher. Then, the restricted area determination section 126 may determine, as the restricted area, a grid in which the calculated total frequency of use is higher than a preset limit value of the total frequency of use.

In the management of plants such as lawn, lawn may be additionally cultivated in a part of the monitoring area (for example, sodding). In an area where lawn is newly cultivated, it is necessary to limit entry into the area and to allow the lawn to grow until the lawn takes root and begins to grow smoothly. Therefore, the detection information acquisition section 122 may store growth information, in which a growing area in the monitoring area and a growth start date and time are correlated with each other, in the storage unit 140 in a correlated manner. The restricted area determination section 126 may refer to the growth information read from the storage unit 140, and determine a grid, in which a growth period from the growth start date and time to the present time is shorter than a preset minimum growth period, as the restricted area regardless of the vegetation state information input from the vegetation analysis section 124. The restricted area determination section 126 may perform a determination of the restricted area or the leading area with respect to a grid, in which the growth period from the growth start date and time to the present time is equal to or more than the preset minimum growth period, with reference to the vegetation state information input from the vegetation analysis section 124.

As described above, the information processing device 100 according to the present embodiment includes the vegetation analysis section 124 that analyzes the vegetation state of the monitoring area on the basis of the detection information acquired from the detection unit (for example, the cameras 200 and 38) and indicating the status of the monitoring area. The information processing device 100 includes the restricted area determination section 126 that defines the restricted area, where entry is restricted, in the monitoring area on the basis of the vegetation state, and the guidance information providing section 128 that provides the terminal device 300 with the guidance information indicating restrictions on entry into the restricted area. The information providing system Si according to the present embodiment includes the information processing device 100 and the terminal device 300, and the terminal device 300 may include the presentation unit 360 that presents the guidance information. With such a configuration, the guidance information for guiding the restrictions on entry into the restricted area defined from the vegetation state analyzed on the basis of the status of the monitoring area is presented to a user of the terminal device 300. Since work for notifying a user of the monitoring area of the restricted area or the restrictions on entry into the restricted area is reduced, it is possible to efficiently manage vegetation in the monitoring area.

In the information processing device 100 according to the present embodiment, the restricted area determination section 126 may analyze the usage status of the monitoring area on the basis of the detection information and define the restricted area on the basis of the analyzed usage status. With such a configuration, the restricted area is defined by further considering the usage status of the monitoring area, which is analyzed from the detection information, as a factor that affects the vegetation state. Therefore, it is possible to accurately define an area, where vegetation needs to be protected, as the restricted area.

In the information processing device 100 according to the present embodiment, the restricted area determination section 126 may define the leading area to be a leading target in the monitoring area on the basis of the vegetation state of the monitoring area, and the guidance information providing section 128 may provide the terminal device 300 with the guidance information indicating leading to the leading area. With such a configuration, the guidance information for guiding leading to the leading area defined from the vegetation state analyzed on the basis of the status of the monitoring area is presented to a user of the terminal device 300. Since the user of the terminal device 300 is encouraged to proceed toward the leading area, it is possible to more reliably avoid entry into the restricted area and to protect vegetation in the restricted area.

The terminal device 300 according to the present embodiment includes the position detection unit that detects the position of the own device, the direction detection unit that detects the direction of the own device, and the presentation processing section 326 that presents the guidance information to the presentation unit 360 when the position of the own device is within a predetermined range from the restricted area and the direction of the own device is within a range in the direction from the position of the own device to the restricted area. With such a configuration, when the own device is close to the restricted area and the direction of the own device is directed to the restricted area, the guidance information can be presented to the presentation unit 360. When the own device is separated from the restricted area or the direction of the own device is different from the direction of the restricted area, the guidance information is not presented. Therefore, when a user is less likely to enter the restricted area, since the presentation of the guidance information is restricted, the possibility of being presented is low, so that it is possible to improve the satisfaction of a user for the terminal device 300.

In the terminal device 300 according to the present embodiment, the position detection unit includes a height detection section that detects the height of the own device, and the presentation unit 360 includes the display that allows the outside view to pass therethrough, and may generate a figure obtained by projecting the outer edge of the restricted area onto the display facing the direction of the own device detected from the position of the own device, and allow the display to display the generated figure. With such a configuration, a user who wears the presentation unit 360 can visually recognize the figure superimposed on the outside view through the display, which includes the restricted area in the three-dimensional space, and indicating the outer edge of the restricted area displayed on the display. Therefore, the user can intuitively grasp the restricted area on the basis of the figure visually recognized in the actual three-dimensional space.

The terminal device 300 according to the present embodiment is a work machine that travels in the monitoring area and performs predetermined work, and the work machine includes the detection unit (for example, the camera 38) that acquires the detection information indicating the status of the monitoring area, and the position information acquisition unit 66 that acquires the position of the own machine. With such a configuration, the terminal device 300 can guide the restricted area to a user in the monitoring area as a work machine that performs work while traveling in the monitoring area, and acquire detection information in correlation with position information indicating the traveled position. Therefore, the user in the monitoring area can be guided to the restricted area even though the user does not carry the terminal device 300 individually, and can acquire the detection information even though any special equipment is not provided. By traveling a work machine as the terminal device 300 to any place of an administrator, it is possible to perform predetermined work, guide the restricted area, and acquire the detection information, thereby improving the efficiency of vegetation management.

Although the embodiment of the invention has been described in detail with reference to the drawings, the specific configuration is not limited to the above, and various design changes and the like can be made without departing from the spirit of the invention.

For example, the number of cameras 200 for acquiring the detection information in the monitoring area is not limited to one, and may be two or more. Allocation of a part, which is a shooting area corresponding to a visual field in which each of two or more cameras 200 captures an image, in the monitoring area may be preset or variable. When the camera 200 includes a moving body and its own position in order to make the shooting area variable, the camera 200 may include the moving body and a position information acquisition unit and transmit position information indicating the position of its own device to the information processing device 100 in correlation with image data of an image captured at that time. On the basis of the position indicated by the position state received from the camera 200 in correlation with the image data, the detection information acquisition section 122 of the information processing device 100 can specify a predetermined visual field in the camera 200, in which the position is a viewpoint, as a shooting area of the camera.

The guidance information may be directly transmitted from the information processing device 100 to the terminal device 300, or may be indirectly transmitted via a predetermined device. The predetermined device may be, for example, an information providing server device such as a web server that is connected to a network and can provide various kinds of information. The information providing server device may store the guidance information received from the information processing device 100, autonomously transmit the guidance information to the terminal device 300 at predetermined time intervals (push-type distribution), or transmit the guidance information to the terminal device 300, which is a transmission source of a guidance information request, as a response for the guidance information request received from the terminal device 300 (pull-type distribution). The information processing device 100 may be configured as the information providing server device such as a web server.

What is claimed is:

1. An information processing device comprising:
a vegetation analysis section configured to analyze a vegetation state of a monitoring area on a basis of detection information acquired from a detection unit and indicating a vegetation status of the monitoring area;
a restricted area determination section configured to analyze a usage status of use of the monitoring area on the basis of the detection information further including use of the monitoring area, and to define a restricted area of the monitoring area where restricted entry is to be requested on a basis of the vegetation state and the usage status; and
a guidance information providing section configured to provide guidance information to a terminal device, the guidance information indicating a requested restriction on entry into the restricted area.

2. The information processing device according to claim 1, wherein the restricted area determination section defines a leading area to be a leading target in the monitoring area on the basis of the vegetation state of the monitoring area, and
the guidance information providing section provides the terminal device with the guidance information indicating leading to the leading area.

3. An information providing system comprising:
the information processing device and the terminal device according to claim 1,
wherein the terminal device comprises:
a presentation unit configured to present the guidance information.

4. The information providing system according to claim 3, wherein the terminal device comprises:
a position detection unit configured to detect a position of its own device;
a direction detection unit configured to detect a direction of the own device; and
a presentation processing section configured to allow the presentation unit to present the guidance information when the position of the own device is within a predetermined range from the restricted area and the direction is within a range in a direction from the position of the own device to the restricted area.

5. The information providing system according to claim 4, wherein the position detection unit comprises:
a height detection section configured to detect a height of the own device,
the presentation unit comprises:
a display configured to allow an outside view to pass therethrough, and
the presentation processing section generates a figure obtained by projecting an outer edge of the restricted area onto the display facing the direction of the own device from the position of the own device, and allows the display to display the figure.

6. The information providing system according to claim 3, wherein the terminal device is a work machine that travels in the monitoring area and performs predetermined work, and
the work machine comprises:
the detection unit; and
a position information acquisition unit configured to acquire a position of its own machine.

7. An information processing method in an information processing device, the information processing method comprising:
analyzing, by the device, a vegetation state of a monitoring area on a basis of detection information acquired from a detection unit;
analyzing, by the device, a usage status of use of the monitoring area on the basis of the detection information including vegetation status and use of the monitoring area;
indicating, by the device, a status of the monitoring area based on the vegetation state and on the usage status; and
defining, by the device, a restricted area of the monitoring area, where restricted entry is to be requested on a basis of the vegetation state and the usage status.

8. The method of claim 7, further comprising:
providing, by the device, to a display of the device, guidance information indicating restrictions on entry into the restricted area.

9. The method of claim 7, further comprising:
defining, by the device, a leading area to be a leading target in the monitoring area on the basis of the vegetation state of the monitoring area.

10. The method of claim 9, further comprising:
providing, by the device, to a display of the device, the guidance information indicating leading to the leading area.

11. An information processing device, which is provided in a terminal device including a presentation unit configured to present guidance information to a user, the information processing device comprising:
a vegetation analysis section configured to analyze a vegetation state of a monitoring area on the basis of detection information acquired from a detection unit and indicating a vegetation status of the monitoring area;
a restricted area determination section configured to define a restricted area of the monitoring area, where restricted entry of the user is to be requested on a basis of the vegetation state; and
a guidance information providing section configured to provide the terminal device with the guidance information indicating a requested restriction on entry of the user into the restricted area.

12. The information processing device according to claim 11,
wherein the restricted area determination section defines the restricted area, where entry of the user is restricted, in the monitoring area on the basis of an intensity of the vegetation state.

13. The information processing device according to claim 12,
wherein the restricted area determination section determines an area, where the intensity of the vegetation state is lower than a predetermined intensity, as the restricted area.

14. The information processing device according to claim 11,
wherein the restricted area determination section defines the restricted area, where entry of the user is restricted, in the monitoring area on the basis of growth information, in which a growing area and a growth start date and time are correlated with each other, stored in a storage unit.

15. An information processing method in an information processing device, which information processing device is provided in a terminal device including a presentation unit configured to present guidance information to a user, the information processing method comprising:

a vegetation analysis step of analyzing a vegetation state of a monitoring area on a basis of detection information acquired from a detection unit and indicating a vegetation status of the monitoring area; and a restricted area determination step of defining a restricted area, where restricted entry of the user is to be requested on a basis of the vegetation state.

* * * * *